(12) United States Patent
Kim et al.

(10) Patent No.: US 7,335,436 B2
(45) Date of Patent: Feb. 26, 2008

(54) PROTON EXCHANGE MEMBRANE FUEL CELL STACK

(75) Inventors: Ji-rae Kim, Seoul (KR); Kyoung-hwan Choi, Kyungki-do (KR)

(73) Assignee: Samsung SDI Co., Ltd., Suwon-Si, Gyeonggi-Do (KR)

( * ) Notice: Subject to any disclaimer, the term of this patent is extended or adjusted under 35 U.S.C. 154(b) by 210 days.

(21) Appl. No.: 10/107,170

(22) Filed: Mar. 28, 2002

(65) Prior Publication Data
US 2002/0142205 A1    Oct. 3, 2002

(30) Foreign Application Priority Data
Mar. 31, 2001    (KR) .............................. 2001-17186

(51) Int. Cl.
*H01M 8/04*    (2006.01)
(52) U.S. Cl. .......................................... 429/35; 429/34
(58) Field of Classification Search ............ 429/34–35, 429/38–39, 30
See application file for complete search history.

(56) References Cited

U.S. PATENT DOCUMENTS

| | | | |
|---|---|---|---|
| 4,977,041 A * | 12/1990 | Shiozawa et al. ............. | 429/26 |
| 5,641,586 A * | 6/1997 | Wilson ......................... | 429/30 |
| 5,955,215 A * | 9/1999 | Kurzweil et al. .............. | 429/41 |
| 6,007,933 A * | 12/1999 | Jones ........................... | 429/38 |
| 6,159,628 A | 12/2000 | Grasso et al. | |
| 6,174,616 B1 | 1/2001 | Marvin et al. | |
| 6,207,312 B1 | 3/2001 | Wynne et al. | |
| 6,399,234 B2 * | 6/2002 | Bonk et al. ................... | 429/32 |
| 6,682,835 B2 * | 1/2004 | Breault ........................ | 429/13 |

FOREIGN PATENT DOCUMENTS

| | | | |
|---|---|---|---|
| EP | 1246289 | * | 10/2002 |
| JP | 07-249417 | | 9/1995 |
| JP | 08-148169 | | 6/1996 |
| JP | 08-185874 | | 7/1996 |
| JP | 11097040 | | 4/1999 |
| JP | 2000-133291 | | 5/2000 |
| JP | 2000-156234 | | 6/2000 |
| WO | WO 99/57781 A1 | | 11/1999 |

* cited by examiner

*Primary Examiner*—Mark Ruthkosky
(74) *Attorney, Agent, or Firm*—Buchanan Ingersoll & Rooney PC

(57) ABSTRACT

Provided a proton exchange membrane fuel cell (PEMFC) stack with at least two cell units. Each cell unit includes: a catalyzed membrane formed by catalyzing both surfaces of an electrolyte layer; a fuel flow field portion and air flow field portion formed at opposite surfaces of the catalyzed membrane, at least one of the fuel and air flow field portions comprising a parallel flow field which induces gas flow in a direction parallel to the surface of the catalyzed membrane and an orthogonal flow field which induces gas flow in a direction orthogonal to the surface of the catalyzed membrane; a bipolar plate in contact with each outer surface of the fuel flow region portion and the air flow region portions. The volume and weight of the entire fuel cell stack can be flexibly reduced by adjusting the number of cell units. In addition, a defective cell unit can be easily replaced without performance degradation in the cell stack. The use of bipolar plates as electrodes promotes gas flow. The PEMFC stack can effectively dissipate the reaction heat with a cooling member and can increase the power density per unit weight and volume. In particular, a pressure drop can be prevented with a serpentine air flow channel formed in the air flow field region, thereby increasing fuel conversion efficiency.

8 Claims, 7 Drawing Sheets

PROTON EXCHANGE MEMBRANE FUEL CELL STACK

BACKGROUND OF THE INVENTION

1. Field of the Invention

The present invention relates to a proton exchange membrane fuel cell stack.

2. Description of the Related Art

Proton exchange membrane fuel cells (PEMFCs) include three constituents forming a basic unit of membrane and electrode assembly (MEA): an anode electrode for oxidation reaction, a cathode electrode for reduction reaction, and an electrolyte for ion transportation.

The anode electrode and cathode electrode include a gas diffusion layer, which promotes the supply of hydrogen and oxygen, and a catalyst layer, which induces chemical reactions and transfers the generated ions. Platinum (Pt)-impregnated carbon with a high reaction activity even at a low temperature is used for the catalyst layer. A porous carbon paper coated with a microporous layer enabling uniform fuel diffusion is used for the gas diffusion layer.

The electrolyte is formed as a fluorinated organic polymer membrane with a high ionic conductivity. A composite membrane with a porous polytetrafluoro ethylene (PTFE) layer and a non-fluorinated organic polymer membrane are also available as the electrolyte.

One of the features of fuel cells such as PEMFC is a considerably high current density per area, but a very low theoretical potential for each MEA. The potential required to induce a sufficient current for use is less than 1V for each MEA. Accordingly, a few to tens of MEA's should be connected in series to obtain a desired potential level for electronic device and electric vehicle applications.

In the manufacture of a stack of multiple cell units, graphite has been widely used due to its excellent electrical conductivity. Also, graphite has good machining property, so it provides a convenience in processing a fine, complex fuel flow field on graphite.

Although graphite have the above-listed advantages, use of graphite in the fabrication of a cell stack is limited by the following problems. In terms of a current need to reduce cell volume and weight per power yield (kW), using graphite as a major constituent of a cell stack is undesirable. Disadvantageously, graphite has a small hardness, so it is easily broken. Therefore, when stacking tens of cell units with the application of a very high pressure, special cautions are needed to prevent individual cell units from being broken. When fuel supply to a certain cell unit of the stack of tens of cell units is not smooth or when the catalyst layer of one cell unit shows a reduced reactivity due to a defect, it is impossible to repair or replace the defective cell unit in a conventional cell stack due to its structural limitations. Although the defective cell unit can be removed from the stack, significant degradation of performance is caused by disassembling and assembling processes.

A conventional stack of cell units has a structural limitation, so it is difficult to stack individual cell units. It is crucial to tightly seal the stack to prevent leakage of fuel gas through the gap between a bipolar plate and MEA. There are complex requirements for a gasket for use in sealing; for example, the gasket should have an appropriate thickness and flexibility and should be durable against chemical reaction without degradation.

SUMMARY OF THE INVENTION

To solve the above-described problems, it is a first object of the present invention to provide a proton exchange membrane fuel cell (PEMFC) stack, which is easy to manufacture, assemble, dissemble, and repair.

It is a second object of the present invention to provide a proton exchange membrane fuel cell stack capable of effective diffusion of fuel and air.

It is a third object of the present invention to provide a proton exchange membrane fuel cell stack capable of effective heat dissipation with improved fuel conversion efficiency.

To achieve the objects of the present invention, there is provided a PEMFC stack with at least two cell units, each cell unit comprising: a catalyzed membrane formed by catalyzing both surfaces of an electrolyte layer; a fuel flow field portion and air flow field portion formed at opposite surfaces of the catalyzed membrane, at least one of the fuel and air flow field portions comprising a parallel flow field which induces gas flow in a direction parallel to the surface of the catalyzed membrane and an orthogonal flow field which induces gas flow in a direction orthogonal to the surface of the catalyzed membrane; and a bipolar plate in contact with each outer surface of the fuel flow region portion and the air flow region portions.

In the PEMFC stack according to the present invention, it is preferable that the air flow field portion comprises a parallel flow field including an air flow channel and a vertical flow field made of a porous material. More preferably, the air flow channel has a serpentine shape.

In the PEMFC stack according to the present invention, it is preferable that the fuel flow field comprises an orthogonal flow field in contact with the catalyzed membrane and a parallel flow field in contact with the orthogonal flow field, and the parallel flow field has a greater porosity than the orthogonal flow field.

It is preferable that the edges of each cell unit are sealed by an external sealing layer to form a single assembly of the cell unit.

It is preferable that a fuel supply passage, a fuel exhaust passage, an air supply passage, and an air exhaust passage are formed through each cell unit. More preferably, a fuel flow barrier sealing layer is formed beside each of the fuel supply passage and the fuel exhaust passage to prevent the flow of fuel along the fuel supply passage and the fuel exhaust passage from entering into the air flow field portion, and an air flow barrier sealing layer is formed beside each of the air supply passage and the air exhaust passage to prevent the flow of air along the air supply passage and the air exhaust passage from entering into the fuel flow field portion.

The PEMFC stack according to the present invention may further comprise a conductive cooling member with a heat-dissipation fin between each of the at least two cell units.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
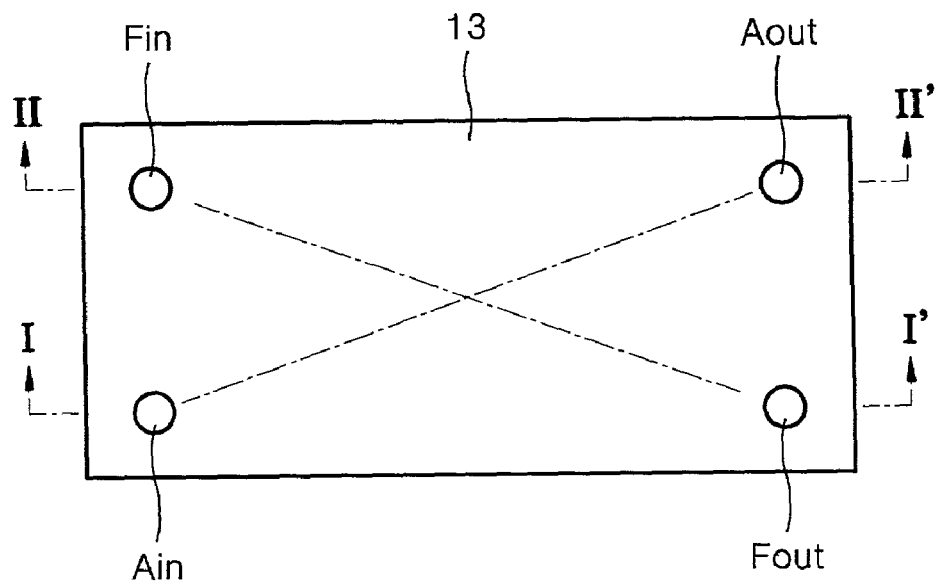
FIG. 1 is a plan view of a single cell unit of a proton exchange membrane fuel cell (PEMFC) stack according to the present invention.

Referring to FIG. 1, a cell unit 10 of a proton exchange membrane fuel cell (PEMFC) stack according to the present invention has a fuel inlet and outlet $F_{in}$ and $F_{out}$ and an air inlet and outlet $A_{in}$ and $A_{out}$ at the four corners, passing through the plate. As shown in FIG. 1, fuel and air diagonally flow in the cell unit 10. In FIG. 1, reference numeral 13 denotes an anode bipolar plate.

The structure of the cell unit 10 will be described with reference to FIGS. 2 through 4. A fuel flow field portion 12 and an air flow field portion 15 are provided at opposite surfaces of a catalyzed membrane 11, which are both catalyzed. An anode bipolar plate 13 and a cathode bipolar plate 14 are formed on the respective outer surfaces of the fuel flow field portion 12 and the air flow field portion 15. The edges of the fuel flow field portion 12 and the air flow field portion 15 are sealed from the outside by an external sealing layer 18. The external sealing layer 18, which is formed of an adhesive component, combines the catalyzed membrane 11 and its upper and lower stacks into a single body as well as seals the edges of the fuel flow field portion 12 and the air flow field portion 15.

The fuel flow field portion 12 of a cell unit includes a parallel flow field (PFF) 12b and an orthogonal flow field (OFF) 12a. The air flow field portion 15 of a cell unit includes a PFF 15b and an OFF 15a. The fuel flow field portion 12 is a region where fuel flows, and the air flow field portion 15 is a region where air flows.

The PFF 12b of the fuel flow field portion 12 and the PFF 15b of the air flow field portion 15 forces the introduced fuel and air to flow, respectively, in a direction parallel to the plane of the catalyzed membrane 11 so that the fuel and air are uniformly diffused into the respective OFF's 12a and 15a.

The OFF's 12a and 15a interposed between the catalyzed membrane 11 and the PFF's 12b and 15b diffuse the fuel and air entering through the respective PFF's 12b and 15b by even diffusion into the catalyzed membrane 11.

Figure 2:
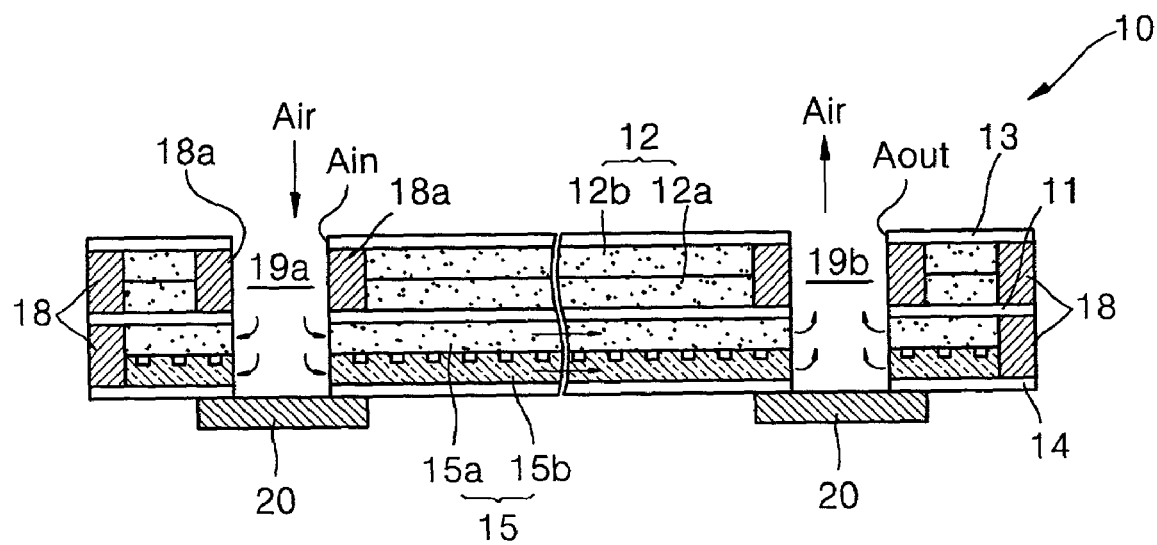
FIG. 2 is a sectional view taken along line I-II' of FIG. 1.

Referring to FIG. 2, an air supply passage 19a and an air exhaust passage 19b are formed vertically through the cell unit 10 in connection with the air inlet $A_{in}$ and the air outlet $A_{out}$, respectively. An air flow barrier sealing layer 18a is formed beside the air supply passage 19a and the air exhaust passage 19b, at portions adjacent to the fuel flow field portion 12 to prevent the air from entering into the fuel flow field portion 12. Therefore, as shown in FIG. 2, the air supplied through the air inlet $A_{in}$ diffuses exclusively through the air flow field portion 15 and discharges through the air outlet $A_{out}$, so that flow of the air through the fuel flow field portion 12 is prevented.

Figure 3:
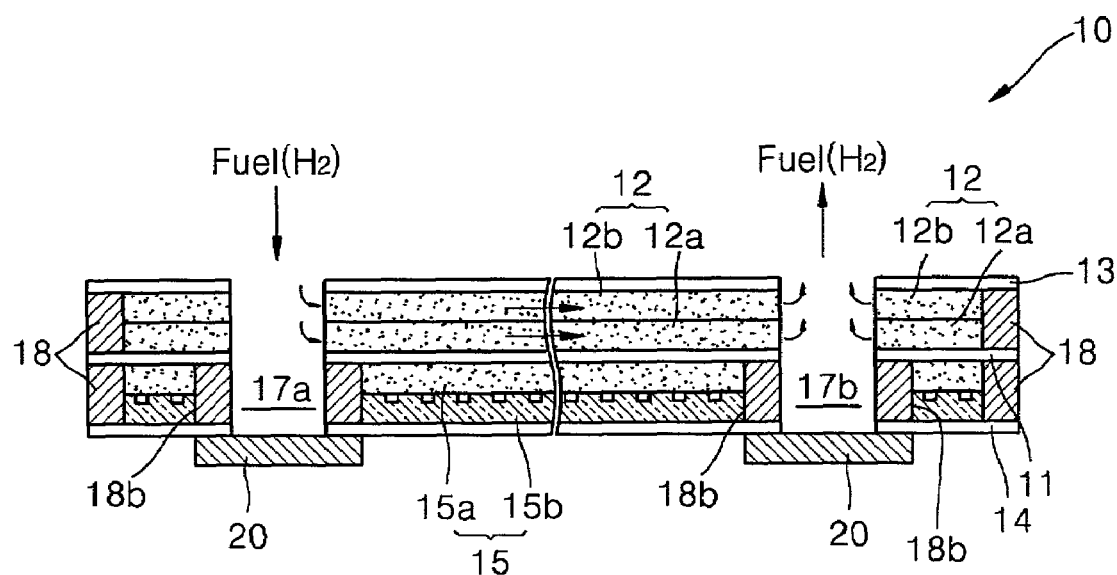
FIG. 3 is a sectional view taken along line II-I' of FIG. 1.

Referring to FIG. 3, an fuel supply passage 17a and an fuel exhaust passage 17b are formed vertically through the cell unit 10 in connection with the fuel inlet $F_{in}$ and the fuel outlet $F_{out}$, respectively. An fuel flow barrier sealing layer 18b is formed beside the fuel supply passage 17a and the fuel exhaust passage 17b, at portions adjacent to the air flow field portion 15 to prevent the fuel from entering the air flow field portion 15. Therefore, as show in FIG. 3, the fuel supplied through the fuel inlet $F_{in}$ diffuses exclusively through the fuel flow field portion 12 and discharges through the fuel outlet $F_{out}$, so that flow of the fuel through the air flow field portion 15 is prevented.

Figure 4:
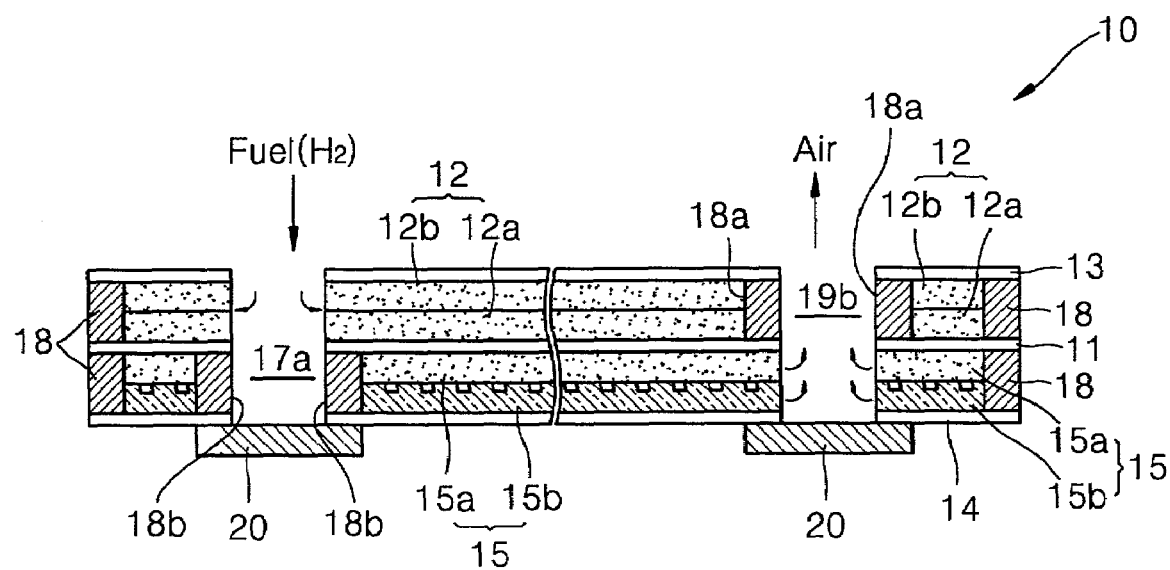
FIG. 4 is a sectional view taken along line II-II' of FIG. 1.

FIG. 4 shows the fuel supply passage 17a and the air exhaust passage 19b at the same time to illustrate the basic structure of the cell unit 100 capable of preventing the fuel and air from being mixed. In this structure, the air flow barrier sealing layer 18a is formed to surround the air supply passage 19a (see FIG. 1) and air exhaust passages 19b, and the fuel flow barrier sealing layer 18b is formed to surround the fuel supply passage 17a and fuel exhaust passages 17b (see FIG. 3). The shapes of the air flow barrier sealing layer 18a and the fuel flow barrier sealing layer 18b are determined by the shape of the corresponding passage. If a passage is formed to be cylindrical, the corresponding air or fuel flow barrier sealing layer 18a or 18b may have a ring shape.

In FIGS. 2 and 4, the air supply and exhaust passages 19a and 19b and the fuel supply and exhaust passages 17a and 17b are closed at the bottom of the cathode bipolar plate by separate members 20.

As described above, the PEMFC stack according to the present invention is characterized in that each cell unit is sealed by the sealing layer to form a single unit block for the fuel cell stack, and the fuel and air passages are formed through the cell unit. Another feature of the present invention is that the cell unit is constructed such that the fuel and air can independently flow through the fuel and air flow field regions, respectively. Due to these structural features of the present invention, one cell unit that is sealed into a single body can be operated alone, and it is very easy to construct a fuel cell stack with a number of individual cell units. In addition, even when a cell unit fails during operation of the fuel cell stack, the fuel cell stack can be easily disassembled and assembled to replace the defective cell unit.

Hereinafter, constituent parts of the cell unit described above and methods of manufacturing the constituent parts will be described.

I. Manufacture of Fuel and Air OFF's

Carbon paper as a substrate is cut to an appropriate size and the thickness and weight of the cut carbon paper were determined. Graphite KS6 is added to deionized water and mixed. Polytetrafluoroethylene (PTFE) and the KS6 graphite emulsion (60% by weight) are mixed in a weight ratio of 1:1 to prepare a desired slurry. The carbon paper is impregnated with an appropriate amount of the slurry. The carbon paper impregnated with the slurry is heated at 140° C. for about 5 minutes and dried. These processes are repeated until the amount of loading reaches a desired level. A microporous layer is formed on the resulting carbon paper by spray coating with the following composition.

The microporous layer is formed as follows. An isopropyl alcohol (IPA) solution is mixed with carbon black (Vulcan XC-72R), and deionized water is added to the mixture to prepare a slurry. The slurry is mixed using a mechanical stirrer at 500 rpm for 5 minutes to make the particle size uniform. An emulsion obtained by mixing PTFE and deionized water is added to the slurry and stirred for additional 5 minutes. A 1:1 mixture of IPA and deionized water is mixed with the PTFE slurry in a 1:1 ratio and spread over the carbon paper. The resulting carbon paper is sintered at 360° C. for 10 minutes to manufacture a target orthogonal flow field (OFF).

II. Manufacture of Anode/Cathode Bipolar plate

IPA and then deionized water are added to carbon particles (Vulcan XC-72) and stirred at 550 rpm for 5 minutes to prepare a Vulcan XC-72R slurry. A PTFE emulsion and deionized water are mixed in a 1:1 ratio, added to the Valcan XC-72R slurry, and stirred at 600 rpm for 3 minutes. A bipolar plate is manufactured using the slurry. Carbon fiber fleece is used as a substrate of the bipolar plate. A 10% PTFF dispersion is permeated into the carbon fiber fleece using a roller. These processes are repeated until the amount of loading reaches a desired level, and the resulting carbon fiber fleece is sintered at 350° C. for 8 minutes.

A bipolar plate is manufactured by impregnating two sheets of the sintered carbon fiber fleece with epoxy. Epoxy and a hardener are mixed in a ratio of 2:1, and ethanol solution is added to the mixture to prepare an epoxy solution. Two sheets of the sintered carbon fiber fleece are impregnated with the epoxy solution and dried at 40° C. for 3 minutes. The two sheets of carbon fiber fleece are compressed at 130° C. and a pressure of 300 kg/m$^2$ for 8 minutes by hot pressing. A gas leakage test on the entire body of the bipolar plate completes formation of a target anode/cathode bipolar plate.

III. Manufacture of PFF of Fuel Flow Field Portion

A 60% by weight of PTFE emulsion and deionized water are mixed in a 1:5 ratio, and carbon paper (Toray 120) is impregnated with the mixture. The resulting carbon paper is dried at 140° C. for 3 minutes and sintered at 350° C. for 8 minutes to thereby form a PFF of the anode fuel flow field portion. Here, the PFF of the anode fuel flow field region has a greater porosity than the OFF of the anode fuel flow field portion.

IV. Manufacture of PFF of Air Flow Field Portion

Carbon paper (Toray 120) impregnated with PTFF is used to manufacture the PFF of the air flow field portion in which a serpentine air flow channel is formed. The air PFF is bonded to the OFF of the cathode air flow field portion. The air flow channel has a 2-mm width and a 0.6-mm depth.

Figure 5:
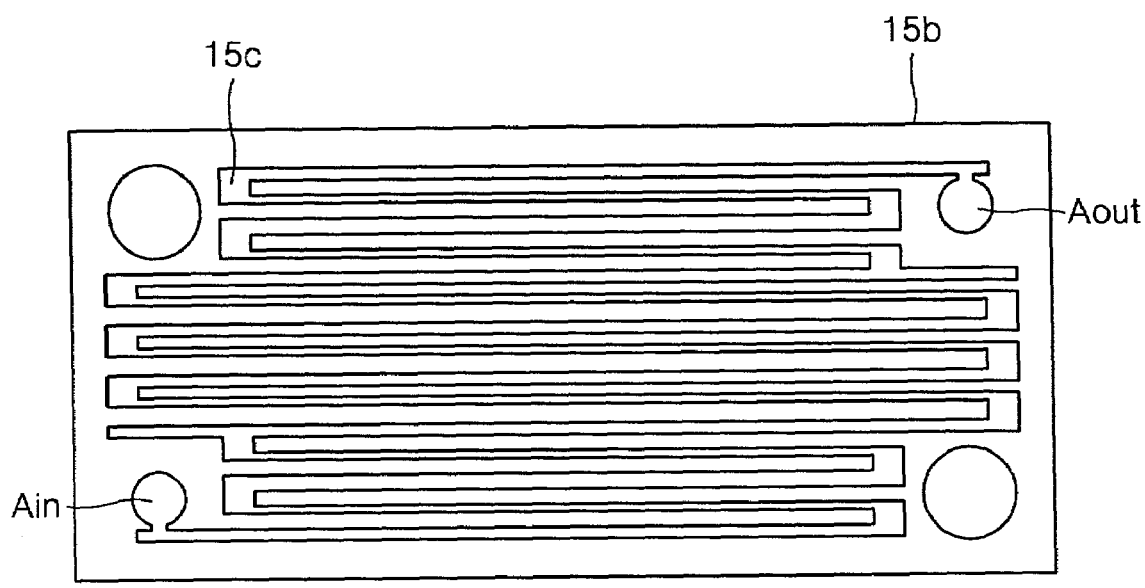
FIG. 5 is a plan view of an air parallel flow field member for the PEMFC stack according to the present invention.

FIG. 5 is a plan view of the PFF 15b of the air flow field portion. As shown in FIG. 5, the serpentine air flow channel 15c is formed in the PFF 15b. A surface of the PFF 15b in which the serpentine air flow channel 15c is formed is brought in contact with the OFF 15a.

V. Cell Unit Sealing Method

After fixing the anode bipolar plate using a sealing jig, the fuel PFF and fuel OFF are sequentially placed at the center of top surface of the anode bipolar plate, and silicon sealing paste is spread onto the edges of the anode bipolar plate. Next, the catalyzed membrane, which is secured by a vacuum plate, is bonded to the fuel flow field portion and left for 12 hours under an appropriate pressure to cure the silicon sealing paste, thereby resulting in an external sealing layer near the anode part.

For sealing at the cathode part, the assembly of the catalyzed membrane and anode fuel flow field portion is supported by the sealing jig such that the catalyzed membrane faces upwards. Then, the air OFF and air PFF are sequentially stacked. Silicon sealing paste is spread onto the edges of the catalyzed membrane, bonded to the cathode bipolar plate, and cured in the same manner as described above to form an external sealing layer at the cathode part.

VI. Fuel/Air Passage Sealing Method

Fuel and air passages are sealed using a silicon tube and silicon sealing paste such that fuel and air introduced into the cell stack are guided and supplied into the respective portions of each cell unit.

Figure 6:
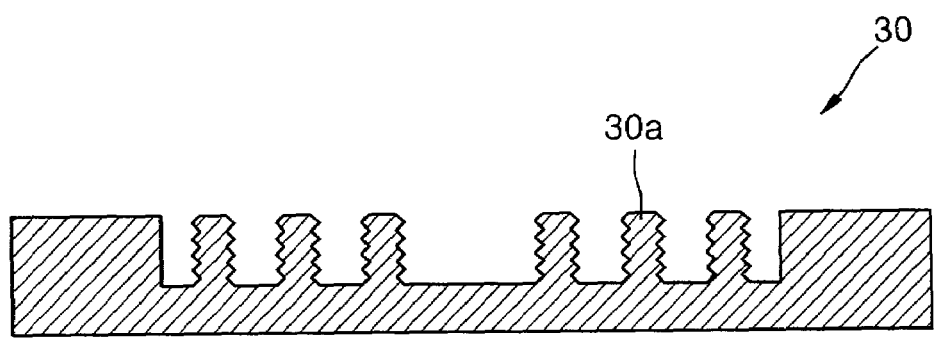
FIG. 6 is a sectional view of a cooling member for the PEMFC stack according to the present invention.

FIG. 6 is a sectional view of a cooling member for each cell unit having the structure described above. The cooling member 30 shown in FIG. 6 acts to dissipate the heat generated as a result of chemical reaction in each cell unit and acts as a current collector between cell units. A plurality of heat-dissipation fins 30a, which give space to allow air flow, are formed in one surface of the cooling member 20. Air is supplied into the cooling member 20 by a separate ventilation apparatus such that the cooling member 20 can effectively dissipate the heat. Optionally, the cooling member 20 may be installed in some of cell units, not between every cell unit.

Figure 7:
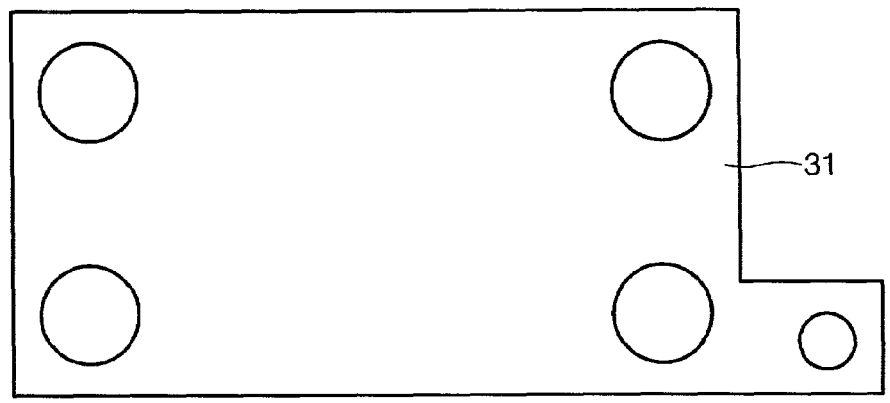
FIG. 7 is a plan view of a current collector for the PEMFC stack according to the present invention.

FIG. 7 is a plan view of a current collector mounted on each of the top and bottom ends of the cell stack according to the present invention. The current collector 31 is coated with gold (Au).

Figure 8:
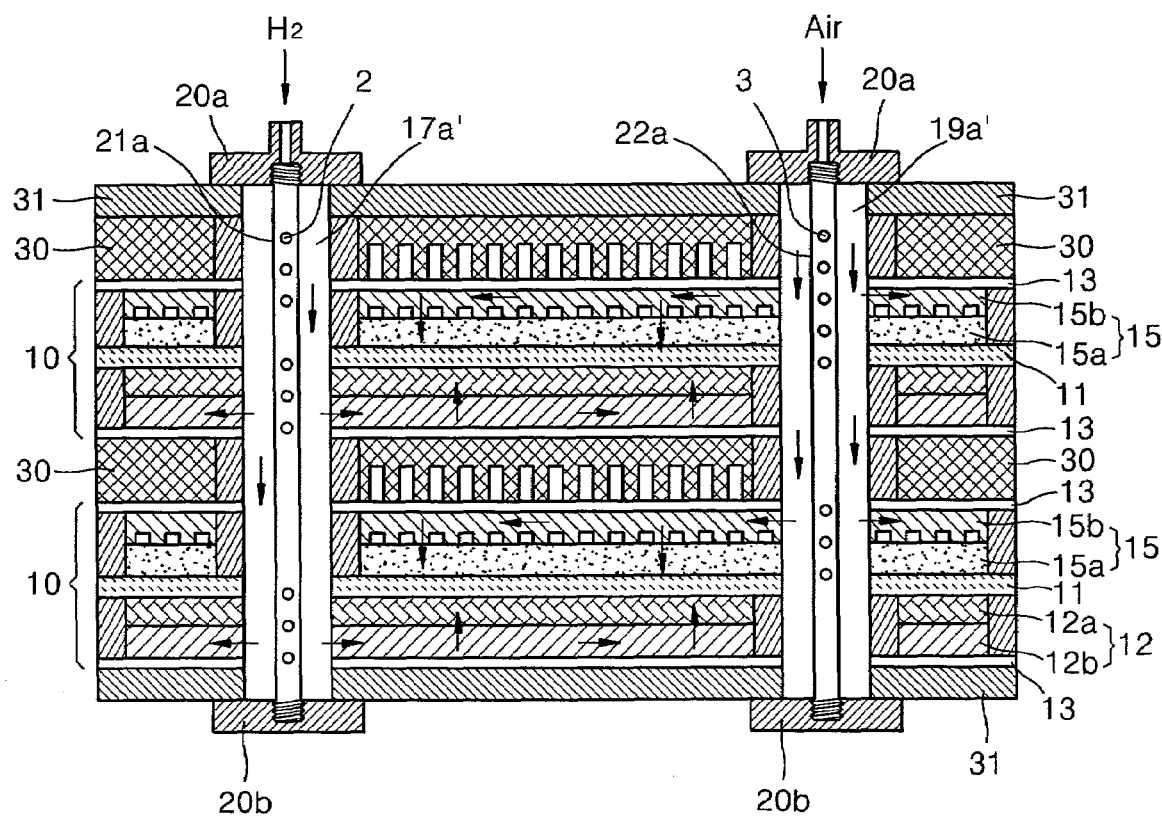
FIG. 8 is a cross-sectional view of the cell units of a PEMFC stack according to the present invention.

FIG. 8 is a cross-sectional view of a cell stack according to the present invention including the cell units 10 described above. As shown in FIG. 8, a cooling member 30 is located in the middle of the cell stack, and each cell unit 10 is stacked on and underneath the cooling member 30. The collector 31 is mounted on each of the upper and bottom ends of the cell stack. The collector 31 includes a plurality of members having conductivity and capable of protecting the cell stack from external impacts.

In FIG. 8, the fuel and air flow through the fuel and air supply passages are also shown. As shown in FIG. 8, the fuel supply passages 17a (see FIG. 4) and air supply passages 19a (see FIG. 4) of each cell unit 10 are integrated into single fuel and air supply passages 17a' and 19a', respectively. A fuel supply pipeline 21a and an air supply pipeline 22a are inserted into the respective fuel and air supply passages 17a' and 19a. The top and bottom of the fuel and air supply passages 17a' and 19a' with the respective fuel and air supply pipelines 21a and 22a are sealed by sealing members 20a and 20b. The fuel and air supply pipelines 21a and 22a, which are tubular, have fuel and air openings 2 and 3, respectively, connected to the respective fuel and air supply passages 17a' and 19a'. In FIG. 8, arrows indicate the directions in which the fuel and air flow.

Figure 9:
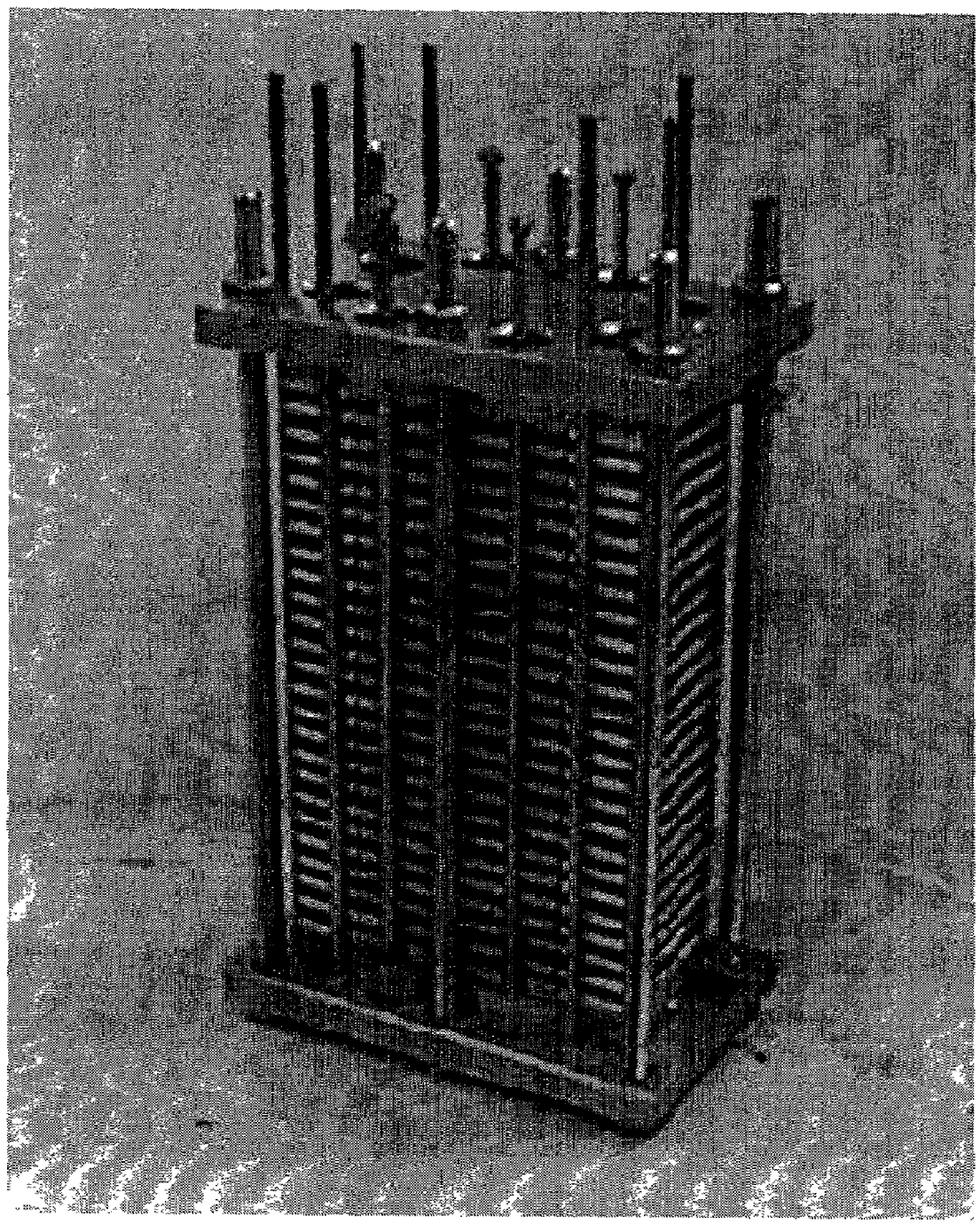
FIGS. 9 and 10 are photographs of a PEMFC stack manufactured as a practical example of the present invention.
Figure 10:
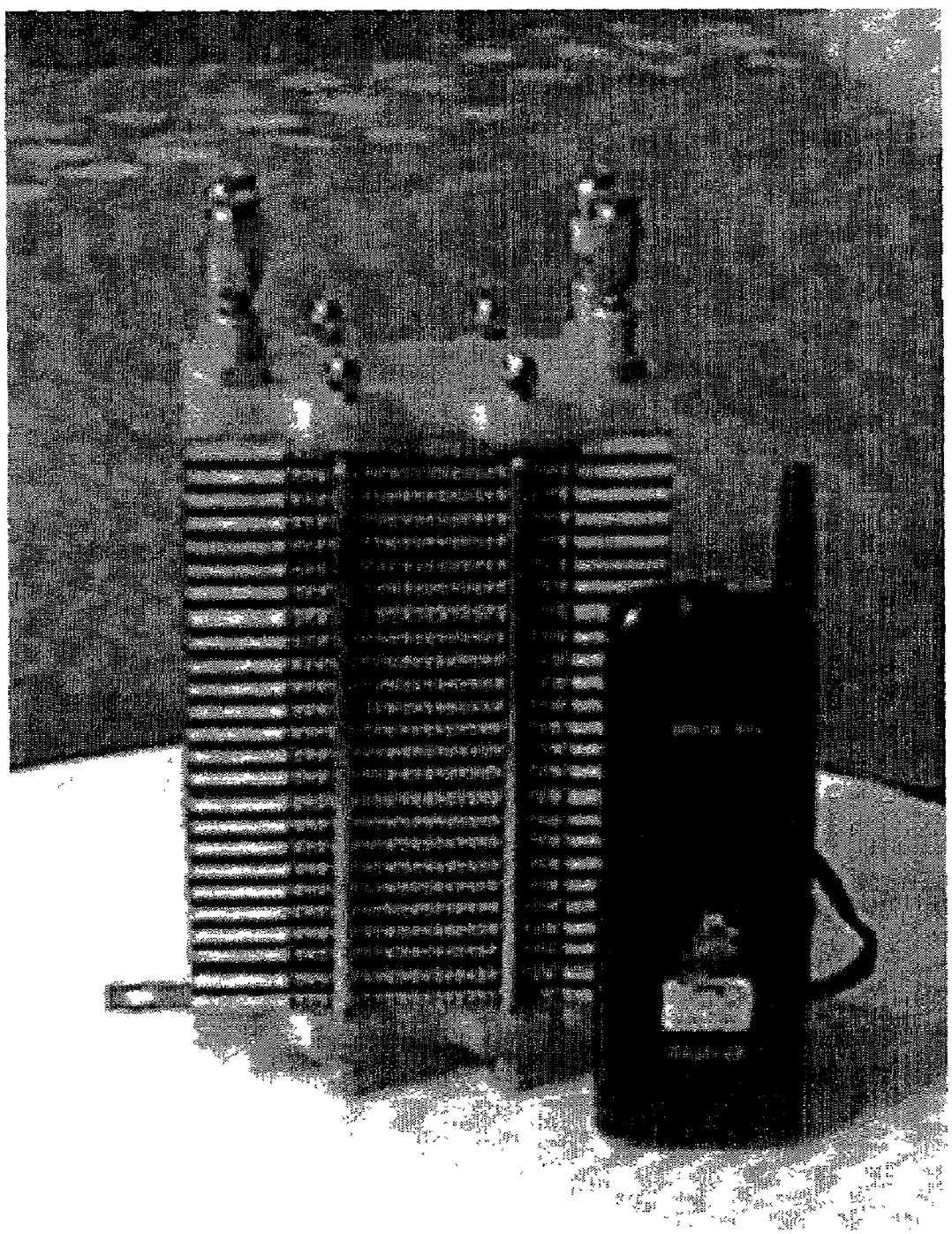

FIGS. 9 and 10 are photographs of a 300-W proton exchange membrane fuel cell stack manufactured as a practical example of the present invention. The proton exchange membrane fuel cell stack of FIGS. 9 and 10 was designed according to the following specifications.

Cell unit area; 50 cm$^2$

Active area; 30 cm$^2$

Cell number; 24 single cell unit

Stack height; 14.7 cm

Stack side lengths; 10 cm, 5 cm

Volume; 0.7 L

Weight; 1.2 kg

Cooling type; Air cooling

Figure 11:
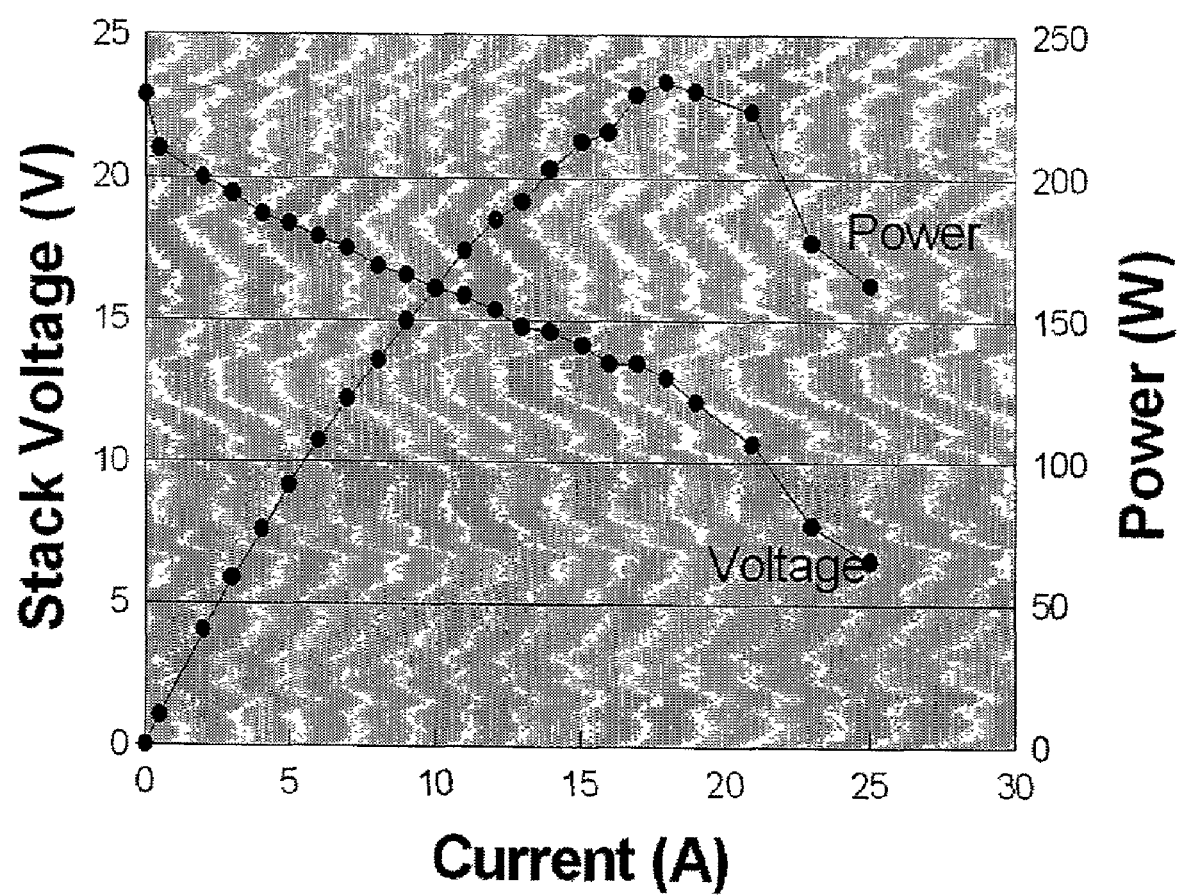
FIG. 11 is a graph illustrating the performance of the proton exchange membrane fuel cell stack according to the present invention shown in FIGS. 9 and 10.

In the PEMFC stack manufactured according to the specifications above, the maximum power was 234 W (13V) and the power density was 320 W/L (13V). The PEMFC stack was operated with a dry $H_2$ pressure of 20 psia and an air pressure of 25 psia. The cell temperature was 55° C. FIG. 11 is a graph showing the performance of the PEMFC stack.

Such a 300-W proton exchange membrane fuel cell stack has a maximum air flow of 5 L/min. Therefore, if a microporous layer is used for the air flow field region, a pressure drop occurs through the air flow passage so that the air cannot be supplied smoothly into the individual cell units. In addition, a localized increase in air pressure may damage the cell units, whereas a localized air shortage may disable the chemical reaction. Accordingly, in the present invention, the serpentine air flow channel is formed in the PFF of the air flow field portion to spontaneously and uniformly supply the air into the entire cell.

Basically, hydrogen as a fuel gas and air diagonally flow in a counter flow configuration. Hydrogen flowed through a gas supply passage diffuses through the microporous layer of a cell unit in a direction parallel to the anode. Then, protons move through the fuel OFF in a vertical direction to the catalyzed membrane. On the other hand, air supplied through an air supply passage flows through the air PFF with the serpentine air flow channel in a direction parallel to the cathode. The serpentine air flow channel is saturated with the air and then the air is supplied to the catalyzed membrane through the air OFF in a directional perpendicular to the cathode.

As described above, in the present invention, the volume and weight of the entire fuel cell stack can be flexibly reduced by adjusting the number of cell units. In addition, a defective cell unit can be easily replaced without performance degradation in the fuel cell stack. The use of bipolar plates as the electrodes promotes gas flow. The present invention can effectively dissipate the reaction heat and can increase the power density per unit weight and volume. In particular, a pressure drop can be prevented with the serpentine air flow channel formed in the air flow field region, thereby increasing fuel conversion efficiency.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A proton exchange membrane fuel cell stack comprising: two cell units, each cell unit comprising:
    a catalyzed membrane formed by catalyzing both surfaces of an electrolyte layer;
    a fuel flow field portion including fuel supply passages;
    an air flow field portion including air supply passages,
        wherein the fuel flow field portion and the air flow field portion are formed along opposite surfaces of the catalyzed membrane, and wherein at least one of the fuel and the air flow field portions comprises a parallel flow field and an orthogonal flow field, wherein the parallel flow field induces either fuel or air flow in a direction parallel to the surface of the catalyzed membrane, and wherein the orthogonal flow field induces air or fuel flow, depending on the fuel or air flow in the parallel flow field, respectively, in a direction orthogonal to the surface of the catalyzed membrane, such that one of the fuel and the air flow field portions induces fuel flow, and the other induces air flow;
    a fuel supply pipeline and an air supply pipeline inserted into the respective fuel and air supply passages, wherein the fuel and air supply pipelines are tubular and have fuel and air openings, respectively, connected to the respective fuel and air supply passages,
        wherein portions of the fuel and air supply passages are sealed by sealing members such that fuel from the fuel supply pipeline is directed to the fuel supply passages, wherein the fuel is not supplied to the air flow field portion, wherein air from the air supply pipeline is directed to the air supply passages, and wherein the air is not supplied to the fuel flow field portion;
    two bipolar plates each in contact with an outer surface of each of the fuel flow field portion and the air flow field portion;
    two cooling members each of which includes heat dissipating fins, wherein each of the cooling members is located on a surface of the each of the cell units; and
    two current collectors, one mounted on each of the upper and bottom ends of the cell stack, wherein the collectors comprise a plurality of members having conductivity and capable of protecting the cell stack from external impacts.

2. The proton exchange membrane fuel cell stack of claim 1, wherein one of the sealing members is a fuel flow barrier sealing layer formed beside the fuel supply passages and the fuel exhaust passages to prevent the flow of fuel along the fuel supply passages and the fuel exhaust passages from entering into the air flow field portion, and one of the sealing members is an air flow barrier sealing layer formed beside the air supply passages and the air exhaust passages to prevent the flow of air along the air supply passage and the air exhaust passage from entering into the fuel flow field portion.

3. The proton exchange membrane fuel cell stack of claim 1, wherein a first layer and a second layer of the fuel flow field portion have minute surface openings and passageways.

4. The proton exchange membrane fuel cell stack of claim 1, wherein the fuel flow field portion comprises a first porous layer adjacent to one of the bipolar plates and a second porous layer between the first porous layer and the catalyzed membrane, wherein fuel diffuses from a fuel inlet through the first porous layer in a direction parallel to the surface of the catalyzed membrane and through the second porous layer into the catalyzed membrane in a direction orthogonal to the surface of the catalyzed membrane.

5. The proton exchange membrane fuel cell stack of claim 1, wherein the fuel flow field portion comprises a first microporous layer adjacent to one of the bipolar plates and a second microporous layer between the first microporous layer and the catalyzed membrane.

6. The proton exchange membrane fuel cell stack of claim 1, wherein said parallel flow field and said orthogonal flow field each comprises carbon paper impregnated with a polytetrafluoroethylene (PTFE) and a graphite emulsion.

7. The proton exchange membrane fuel cell stack of claim 1, wherein the bipolar plates comprise sintered carbon fiber fleece impregnated with epoxy.

8. The proton exchange membrane fuel cell stack of claim 1, further comprising a cured sealing paste located between at least one of the bipolar plates and the catalyzed membrane to seal the fuel flow field portion and/or the air flow field portion.

* * * * *